Dec. 7, 1926.
C. A. ROBERTS
SIGNAL
Filed Oct. 5, 1925        2 Sheets-Sheet 1
1,610,157
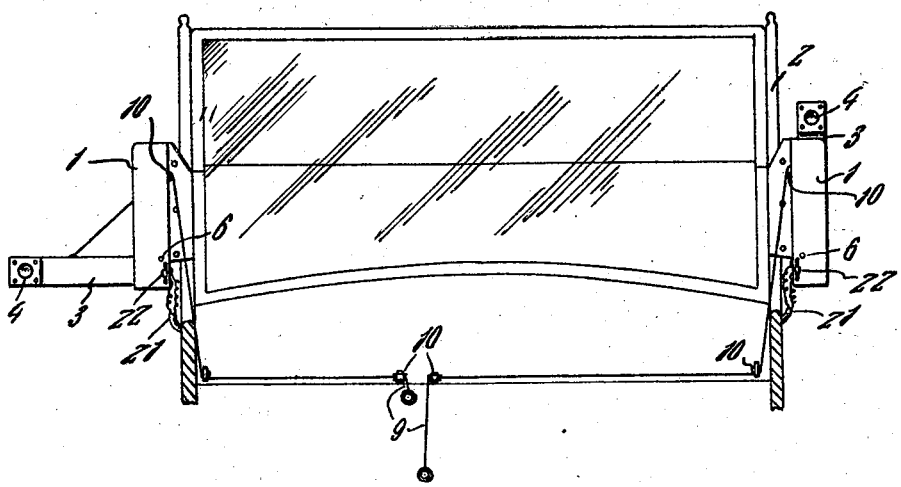
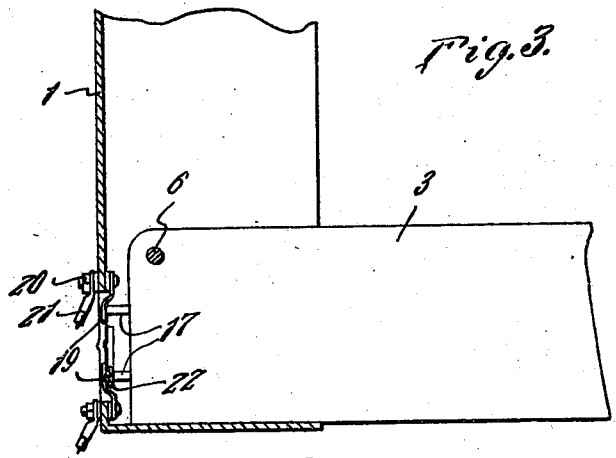
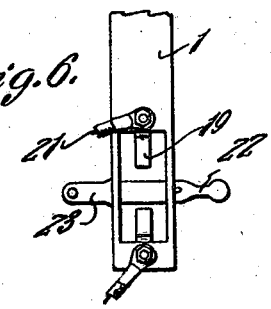
C. A. Roberts
INVENTOR
BY Victor J. Evans
ATTORNEY Dec. 7, 1926.
C. A. ROBERTS
SIGNAL
Filed Oct. 5, 1925
1,610,157
2 Sheets-Sheet 2
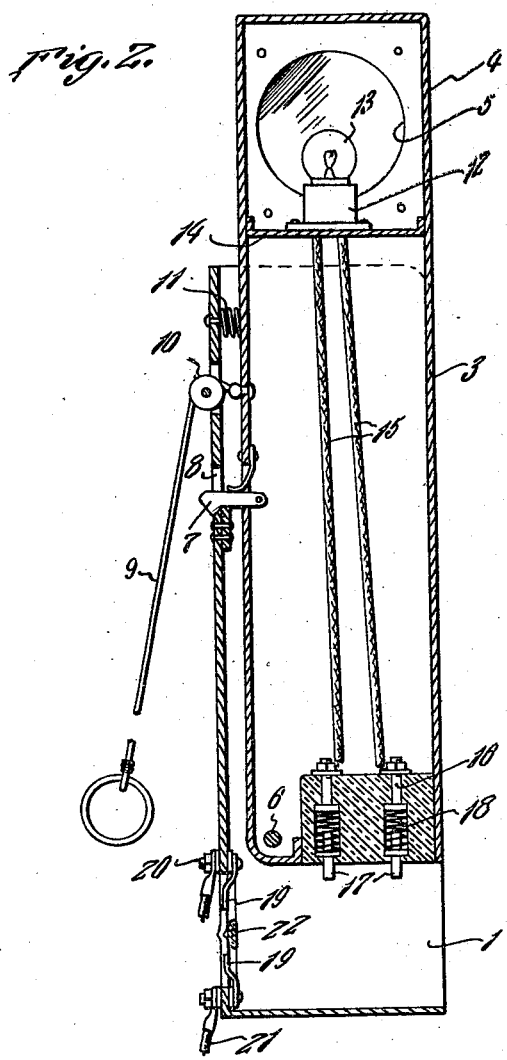
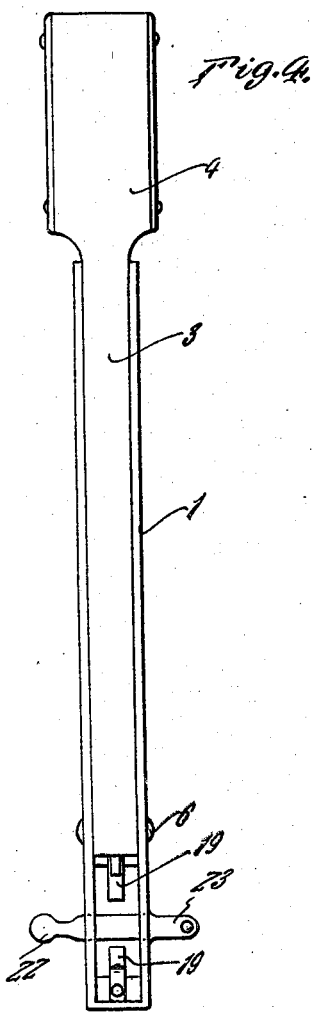
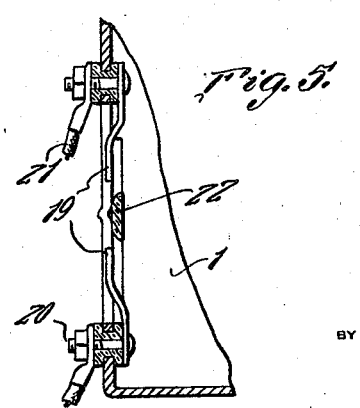

Patented Dec. 7, 1926.

1,610,157

UNITED STATES PATENT OFFICE.

CHARLES A. ROBERTS, OF BUTTE, MONTANA.

SIGNAL.

Application filed October 5, 1925. Serial No. 60,541.

This invention relates to a signal for a vehicle, the general object of the invention being to provide a signal arm which is normally held encased but which can be easily and quickly dropped to a horizontal position, so that pedestrians and the drivers of other vehicles, both in front and in rear of the vehicle carrying the signal, will be notified that the vehicle is to make a turn or is to be stopped.

A further object of the invention is to provide a simple pull cord for operating the signal so that levers and the like are eliminated.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a sectional view through a portion of the vehicle, showing the invention in use.

Figure 2 is a vertical sectional view through a signal device.

Figure 3 is a detail sectional view showing the signal arm in lowered position.

Figure 4 is a front view of the device.

Figure 5 is a sectional detail view through the switch means.

Figure 6 is a detail front view of said switch.

As shown in Figure 1, I prefer to place a signal device at each side of the windshield, so that the signals can be seen by pedestrians and drivers of other cars, no matter in what position they are in relative to the vehicle which carries the signal.

Each signal comprises a housing 1 which is formed of a bracket 2 so that it can be clamped or otherwise fastened to the frame of the windshield. The front and top of said housing are open. The signal arm 3 is of hollow construction and has an enlarged upper end 4, a window 5 being located in each of the front and rear faces of said enlarged end. A pin 6 passes through the housing and through the lower inner corner of the arm, the pin being so located that the arm can drop into a horizontal position with the bottom of the housing acting as a stop to limit the downward movement of the arm. The arm also tends to drop under the action of gravity. The arm, when in vertical position, is enclosed by the housing, but its upper end 4 projects from the housing. A spring pressed latch 7 has a beveled part engaging a beveled wall of a keeper opening 8 in the rear of the housing to hold the arm in vertical position. A cable 9 is attached to the arm above the latch and passes over the guiding pulleys 10, one of which being supported on the housing 1 and the others on the vehicle. The ends of the cables for the devices terminate at a point where they can be readily grasped by the driver of the vehicle. A coiled spring 11 is arranged in the upper part of the housing and acts as a shock absorber for the arm, as the same is pulled into the housing and this spring also helps gravity to throw the arm downwardly and to release the latch when the cable 9 is pulled to move the arm rearwardly to compress the spring and to move the beveled part of the latch a slight distance from the inclined part of the keeper opening 8. Then when the cable is released, the pressure of the spring on the arm and the action of gravity will throw the arm forwardly so that the latch will ride over the inclined wall of the keeper opening and the arm will drop into horizontal position. The pressure of the latch spring is sufficient to hold the arm in its vertical position.

A socket 12 for a lamp 13 is carried by a partition 14 in the arm which forms a chamber in the part 4 thereof. This lamp, when lighted, will illuminate the windows. The conductors 15 for the lamp pass through the stem part of the arm and are connected with the terminals 16 which are electrically connected with the spring plungers 17 carried by an insulated block 18 in the lower part of the arm. When the arm is in horizontal position, these plungers will engage the springs 19 on the terminals 20 which are connected by the conductors 21 with a source of supply. Thus the circuit to the lamp will be closed as soon as the arm reaches the limit of its downward movement and the circuit will be broken when the arm starts to raise. In order to provide means for breaking the circuit during the day or whenever desired, I provide a switch 22 formed in part of insulating material and which is pivoted to a projection 23 on the housing. The central part of the switch is beveled on its edges so that when it is moved from a central position, it will pass over either one of the springs 19 and thus prevent the plunger 17 from contacting with its spring, thus preventing the completion of the circuit.

From the foregoing, it will be seen that the arm will naturally assume a horizontal position under the action of gravity and of the spring 11, but this is prevented by the spring latch 7. When the device is to be operated, the cable 9 is given a slight jerk and then released so as to first move the arm rearwardly to compress the spring 11 and to space the latch from its keeper. Then the spring throws the arm forwardly and the momentum of the arm will cause the latch to ride over the beveled part of the keeper opening and thus the arm will drop to its horizontal position. As soon as it reaches its lowest position, the circuit will automatically close and the lamp will be lighted, provided the switch 22 is in neutral position.

The arm may be of red color or otherwise marked so that it will be readily taken for a signal.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described including a housing open on one side and at one end, a signal arm normally disposed within said housing with one end projecting beyond the open end of the housing, means for pivotally mounting said arm to permit swinging movement of the same relative to the housing, said housing having a keeper opening, with one wall bevelled outwardly, a spring latch carried by the arm and adapted to engage the wall of the opening for normally retaining said arm within the housing, a transverse partition in the housing adjacent one end thereof forming a lighting chamber, a lamp within said chamber, means connecting the lamp with a source of electrical supply, a cable extending through a cross wall of the casing and having connection with the arm whereby to move said arm to an inoperative normal position for engaging the spring latch with one wall of the keeper opening, and a coil spring carried by one wall of the housing and adapted to be engaged by the arm when moved to a position within the housing whereby the tension of the said spring will be compressed upon the engagement of the latch with one wall of the keeper opening, the tension of said spring having a tendency to force the arm out of the casing upon the release of said latch.

In testimony whereof I affix my signature.

CHARLES A. ROBERTS.